US007035203B2

(12) United States Patent
Licata et al.

(10) Patent No.: US 7,035,203 B2

(45) Date of Patent: Apr. 25, 2006

(54) INTERCONNECTION BETWEEN TELECOMMUNICATION MS-SPRING AND SNCP RING NETWORKS

(75) Inventors: Giuseppa Licata, Segrate (IT); Ernesto Colizzi, Monza (IT)

(73) Assignee: Alcatel, Paris (FR)

(*) Notice: Subject to any disclaimer, the term of this patent is extended or adjusted under 35 U.S.C. 154(b) by 948 days.

(21) Appl. No.: 09/863,468

(22) Filed: May 24, 2001

(65) Prior Publication Data

US 2003/0206515 A1 Nov. 6, 2003

(30) Foreign Application Priority Data

May 26, 2000 (IT) .......................... MI2000A1163

(51) Int. Cl.
*G01R 31/08* (2006.01)

(52) U.S. Cl. ...................................... 370/216; 370/224

(58) Field of Classification Search ................ 370/216, 370/222, 223, 224, 225, 259, 351, 395.1, 370/404, 217, 219, 220, 221, 228; 398/9, 398/79

See application file for complete search history.

(56) References Cited

U.S. PATENT DOCUMENTS 5,278,824 A * 1/1994 Kremer ...................... 370/223
5,394,389 A * 2/1995 Kremer ...................... 370/223
5,406,549 A * 4/1995 Kremer ...................... 370/224
5,515,367 A * 5/1996 Cox et al. ................... 370/404
5,930,016 A * 7/1999 Brorson et al. ............... 398/79
6,147,968 A * 11/2000 De Moer et al. ........... 370/225
6,259,837 B1 * 7/2001 de Boer et al. ............... 385/24
6,400,682 B1 * 6/2002 Regula ....................... 370/223
6,400,859 B1 * 6/2002 de Boer et al. ............... 385/24
6,529,298 B1 * 3/2003 Phelps et al. .................. 398/9
6,658,013 B1 * 12/2003 de Boer et al. ............. 370/404
6,731,597 B1 * 5/2004 Batchellor et al. .......... 370/223

OTHER PUBLICATIONS

ITU-T Recommendation G.805 dated Nov. 1195, —Digital Network—Generic Functional Architecture of Transport Networks.

ITU-T Recommendation G.842 dated Apr. 1997, Series G: Transmission Systems and Media, Digital Systems and Networks—Digital transmission systems—Digital networks—SDH Network Characteristics—Interworking of SDH Network Protection Architectures.

ITU-T Recommendation G.841 dated Oct. 1998, Series G: Transmission Systems and Media, Digital Systems and Networks—Types and characteristics of SDH network protection architectures.

* cited by examiner

*Primary Examiner*—Phirin Sam
(74) *Attorney, Agent, or Firm*—Sughrue Mion, PLLC

(57) ABSTRACT

A method is disclosed for interconnecting an MS-SP ring network and an SNCP ring network in a Dual Node and Bridge and Switch architecture through a primary interconnection node and a secondary interconnection node connected by an optical fiber span, said primary interconnection node comprising means for carrying out a Drop and Continue operation and a service selector for each circuit. The architecture provides for closing said SNCP ring network through the service selector of the primary node of the MS-SP ring network. In this way the management of the selectors is simplified, less I/O interfaces as well as less optical fiber are used and the available band is better exploited.

5 Claims, 5 Drawing Sheets

RING1
A
B
D&C
SS'M
N
M
RING2
G
H
PSH

INTERCONNECTION BETWEEN TELECOMMUNICATION MS-SPRING AND SNCP RING NETWORKS

INCORPORATION BY REFERENCE OF PRIORITY DOCUMENT

This application is based on and claims the benefit of Italian Patent Application No. MI2000A001163 filed May 26, 2000, which is incorporated by reference herein.

BACKGROUND OF THE INVENTION

1. Field of the Invention

The present invention generally pertains to telecommunications networks and in particular to interconnection between an MS-SPRING network and a High-Order SNCP ring network.

2. Description of the Prior Art

In modem telecommunications networks it is becoming extremely important to have the possibility to repair the failures occuring in the networks themselves without impairing the functionality of the service. Therefore ring architectures are more and more frequently used and furthermore the telecommunications networks are generally provided with protection means against possible failures of their components.

In the SDH MS-SP (Multiplex Section Shared Protection) RING networks, for instance, a distributed protection mechanism is implemented that allows the automatic traffic restoration should a fault occur in the connection fibers. In other words, the MS-SP ring networks perform the automatic traffic restoration through a synchronized re-routing of said traffic, which is carried out at each node of the ring. This operation is controlled by a protocol consisting of messages that are continuously exchanged between adjacent nodes. Said protocol and the related operations are defined by several international standards, issued by ANSI, by ITU-T and by ETSI, and they are characterized by a certain set of rules and messages. See for instance the ITU-T Recommendation G.841.

An SNCP ring network (see definition 3.31 set forth in ITU-T Recommendation G.805) is a ring network with a type of protection which is shaped by a sublayer generated by expanding the connection point of the subnetwork (where, by "subnetwork" is meant that topological component used to carry out the routing of a specific characteristic information).

One of the most important network architectures is composed by the interconnection of ring networks using a "Dual Node and Drop & Continue" architecture, namely, an architecture where two nodes of each ring are interconnected. The "Drop & Continue" function that is a function that is implemented within a node wherein the traffic is dropped from the working channels on the ring and, at the same time, continued over the ring.

The classic solution provides for four network elements or nodes (two for one ring and two for the other ring) that are interconnected through STM-N interfaces; however, through the use of large ADMs (Add Drop Multiplexers) or DXCs, (Digital Cross Connects) that substantially integrate two nodes and operate as ring closures, it is possible to reduce the overall number of interconnection nodes to two. In this case the interconnection is done in the network element matrix without using the STM-N interfaces.

The "Dual Node and Drop & Continue" architecture is known from the ITU-T Recommendation G.842 but such a Recommentadion only provides for the case of four separate interconnection nodes. Even if one would integrate two nodes into one (thus avoiding the use of STM-N interfaces) this solution would have the same inconveniences from a management point of view since three selectors for each circuit should be anyway used and managed. Another drawback of this possible solution wherein two nodes are integrated into one is that it would be expensive in terms of fiber utilized and band exploitation.

SUMMARY OF THE INVENTION

In view of the known solutions and disadvantages thereof, the main object of the present invention is to indicate an interconnection architecture between an MS shared protection ring and a Dual Node and Drop & Continue high order SNCP ring by utilizing only two nodes but avoiding the management complexity of the known solutions.

A further object of the present invention is to provide an architecture of the aforesaid type which is less expensive in terms of optical fiber utilized and in terms of bandwidth.

These and further objects are achieved through a method and through a network element as described herein.

The basic idea of the present invention consists in closing the SNCP ring directly in the Service Selector of the MS shared protection ring.

The invention will certainly result in being clear in view of the following detailed description, given by way of a mere non limiting example, to be read with reference to the attached drawings.

BEST MODE FOR CARRYING OUT THE INVENTION

Figure 1:
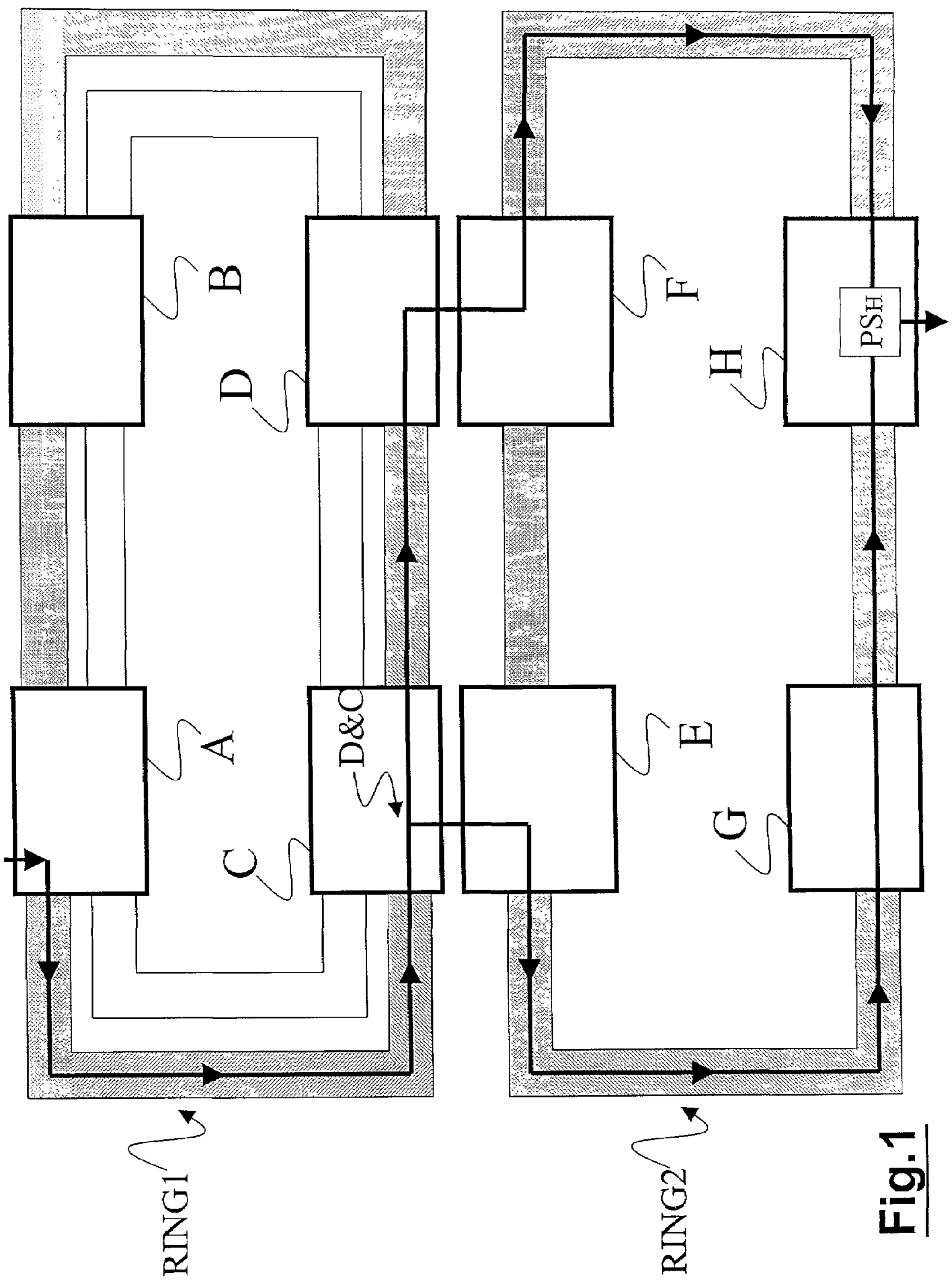
FIG. 1 shows an MS shared protection ring interconnected with an SNCP ring in a Dual Node and Drop & Continue architecture which is performed with four Network Elements in which the path is from node A to node H.

The same reference numerals will be used to designate similar parts or functionally equivalent components throughout the several figures. In the various figures, there are always depicted a four-fiber MS shared protection ring network (RING 1) and an SNCP ring network (RING 2) connected through nodes or network elements (C, D, E, F; M,N). Node C of FIGS. 1 and 2 (node M of FIGS. 3 to 5) is considered the primary node of the MS shared protection ring whereas node D of FIGS. 1 and 2 (node N of FIGS. 3 to 5) is considered the secondary node of the MS shared protection ring. In RING 1, the (protected) working fiber is indicated by grey "tubes" whereas the protection fiber is indicated by white "tubes". The various paths are depicted by solid bolt lines provided with arrowheads to clearly show the direction (substantially according to the ITU-T Recommendation G. 842). Naturally, the fact of representing RING 1 as a four-fiber ring is simply dictated by practical reasons of representation, but the same concepts apply to two-fiber rings.

With reference to FIG. 1, a protected path from a source node A to a destination node H utilizes a working fiber from A to C (primary node); the Drop & Continue (D&C) function is performed at C, namely the traffic is dropped towards node E of RING 2, but it is also passed through to the secondary node D; then it passes from node E to node G (which allows it to pass through) up to the destination node H; at the same time, the continued traffic passes from nod D to node F until it reaches the destination node H too. Present in the node H is a Path Selector ($PS_H$) that selects the path coming from one side or from the other (depending on the path status).

Figure 2:
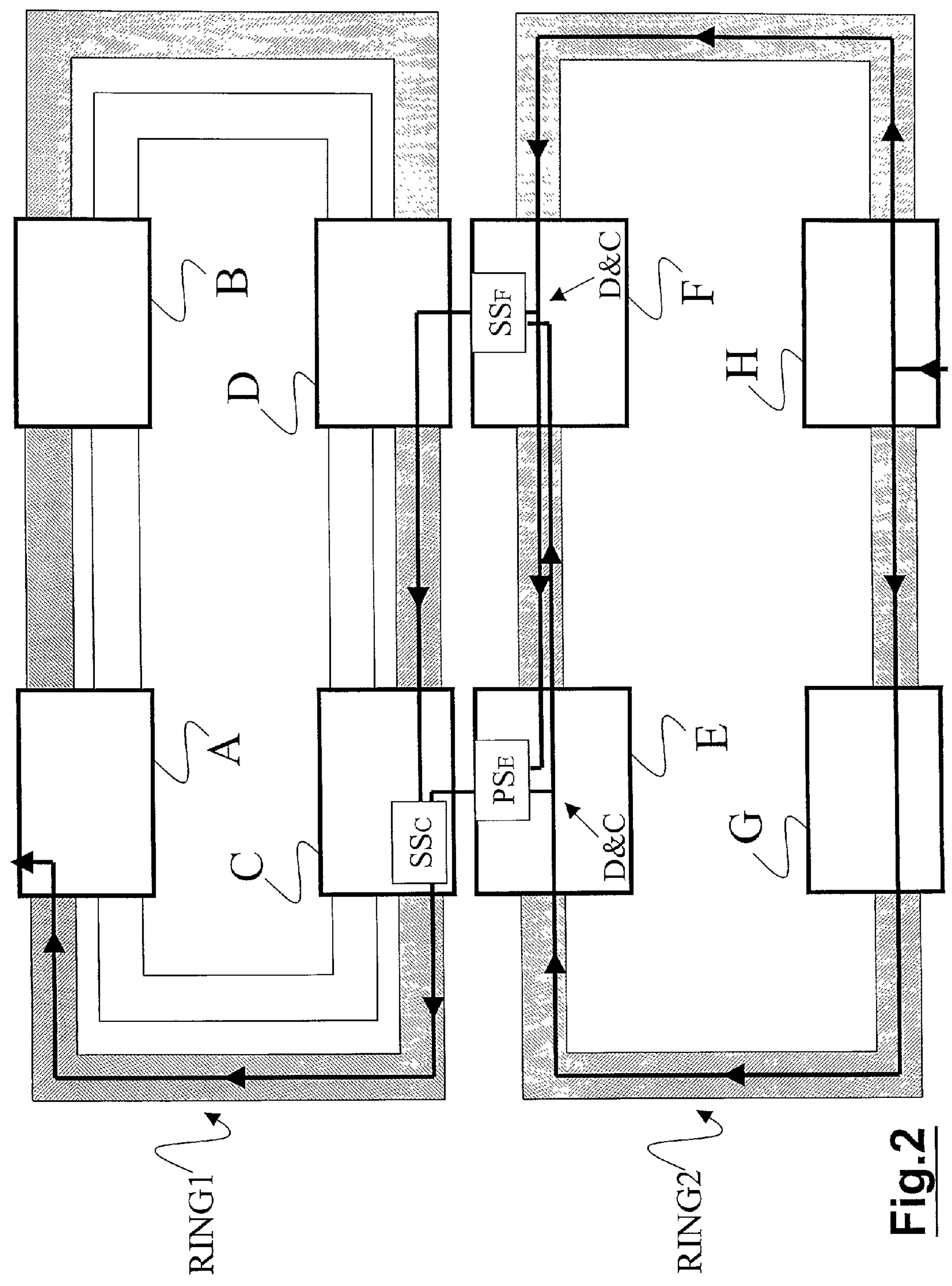
FIG. 2 is similar to FIG. 1, but the path is in the opposite direction, namely from node H to node A.

In FIG. 2 the same architecture with path from H to A is shown. The path goes from H (source node, RING 2) to A (destination node, RING 1). The signal goes from node H 1) to node G up to node E where it is i) dropped and sent to a Path Selector ($PS_E$) and ii) continued towards the Service Selector ($SS_F$) of node F; and 2) to node F where it is iii) dropped towards the Service Selector $SS_F$ and iv) continued towards the Path Selector $PS_E$ of node E. The path passes from the Path Selector $PS_E$ of node E to a Service Selector $SS_C$ of node C. Similarly, the path passes from the Service Selector $SS_F$ of node F to node D and to the Service Selector $SS_C$ of node C. The Service Selector $SS_C$ selects one of the two signals and sends it to the destination node A.

This known solution has the disadvantages that it utilizes four nodes for the interconnection, bandwidth and tributary ports for establishing the interconnection between each pair of nodes.

Figure 3:
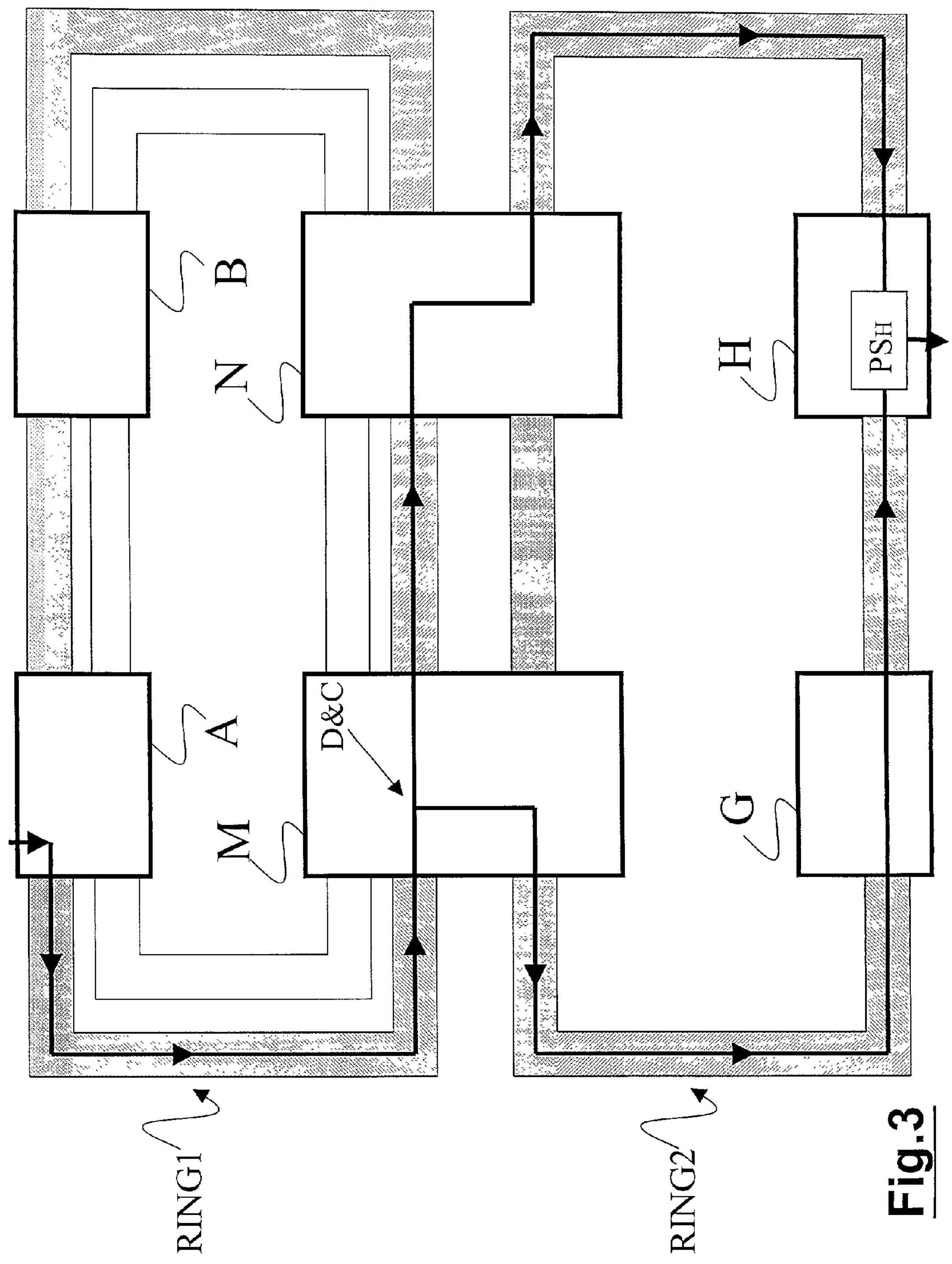
FIG. 3 shows an MS-shared protection ring interconnected with an SNCP ring in a Dual Node and Drop & Continue architecture realized with only two Network Elements in which the path is from node A to node H.
Figure 4:
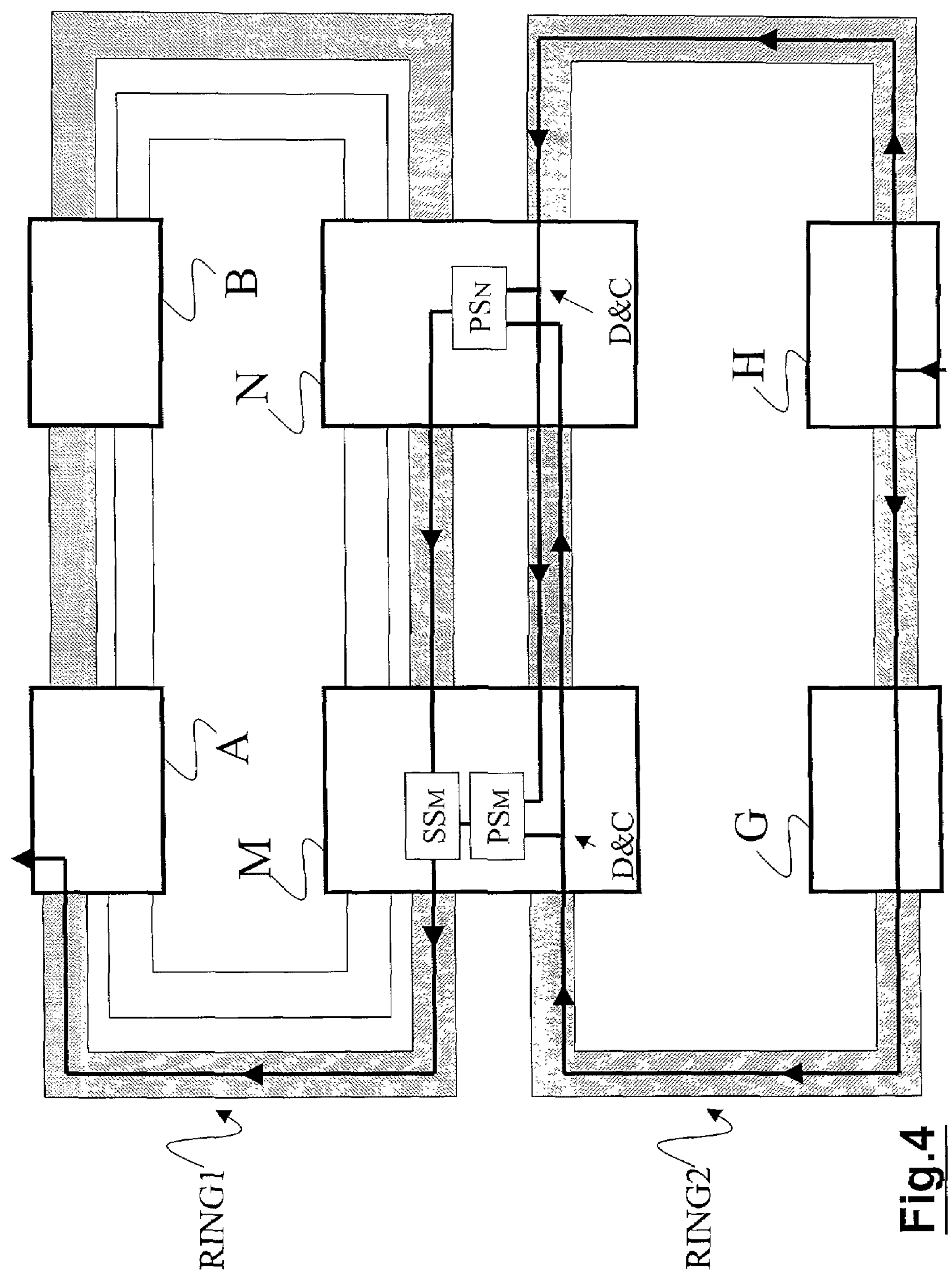
FIG. 4 is similar to FIG. 3, but the path is in the opposite direction, namely from node H to node A.

The architecture of FIGS. 3 and 4 is functionally similar to the one of FIGS. 1 and 2 but the Network Elements C and E are integrated into a single network element M (an ADM or a DXC). An analogous argument applies to nodes D and F, integrated into N. In this case, the advantage resides in the reduction of both apparatus and interconnection interfaces but it introduces the disadvantage that three selectors (two of which ($SS_M$, $PS_M$) in the same matrix) are to be managed, that fiber between primary and secondary nodes is not utilized in an optimal manner and that some bandwidth is not used.

Figure 5:
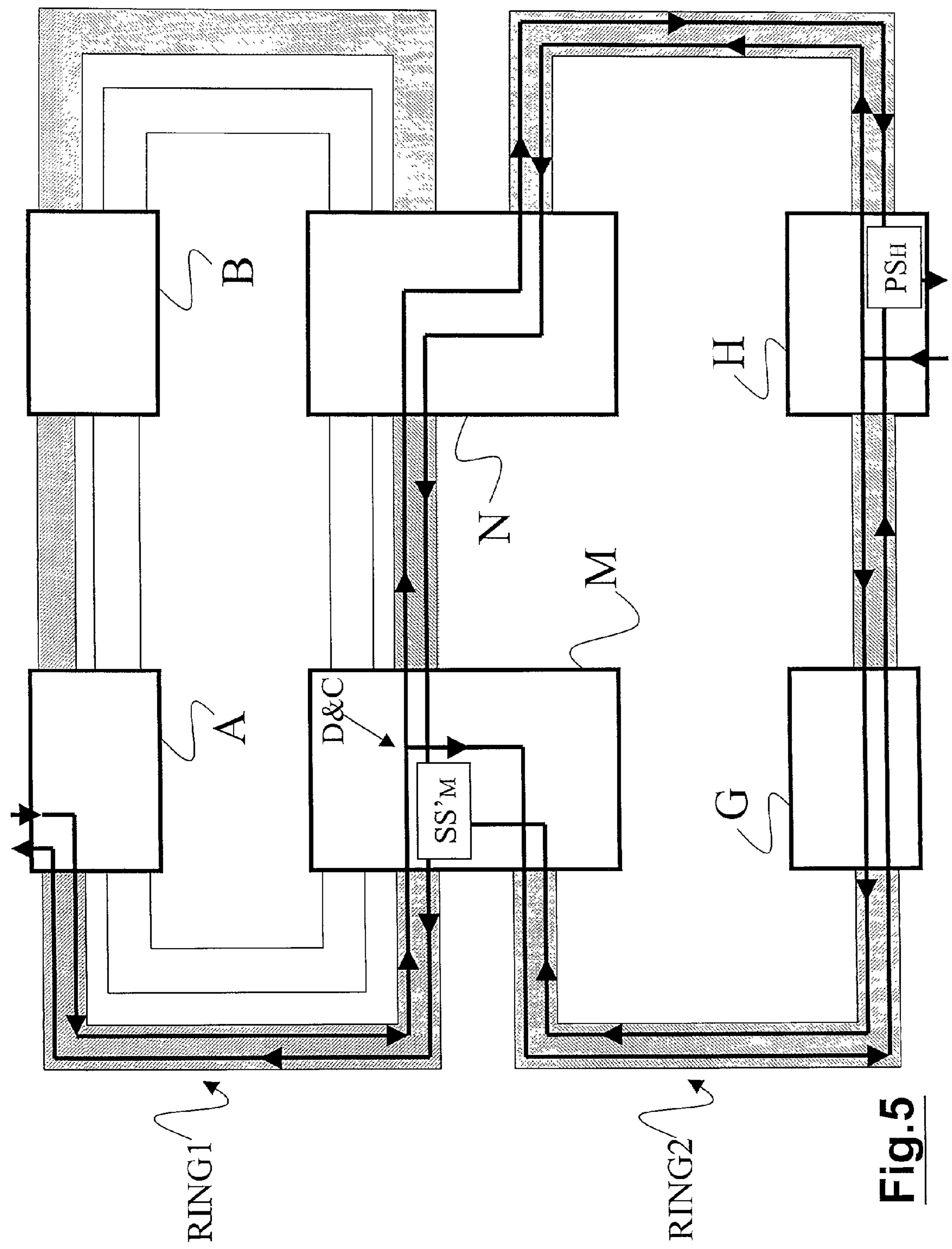
FIG. 5 shows an MS shared protection ring interconnected with an SNCP ring in a Dual Node and Drop & Continue architecture according to the present invention.

Before entering into a description of the architecture in accordance with the present invention with reference to FIG. 5, brief reference will be made to the concept of primary node and Service Selector (SS) in an MS shared protection ring network. The primary node is that node which provides the Service Selection and Drop & Continue (D&C) functions for a tributary. Naturally, different tributaries can have different primary nodes designated. A Service Selector (SS) is the function of a node that is used for ring interconnection. It selects the traffic from channels coming from one side of the node or the traffic entering the ring, according to certain criteria.

As it will be readily noted, the architecture of the invention adopts a "Dual node and Drop & Continue" function realized with only two connection nodes (M and N). The primary node of the MS shared protection ring, Node M, comprises the Service Selector (or Bridge & Switch selector) $SS'_M$ and just this selector is utilized to close the HO SNCP ring.

Thus, a path entering the MS shared protection ring network (RING 1) from node A will reach the primary interconnection node M where it will be dropped towards the SNCP ring (RING 2) within the matrix, it will pass through the intermediate node G and reach the Path Selector ($PS_H$) of the destination node H. In the network element M the path is also continued (D&C) towards the secondary interconnection node N so as to reach the Path Selector ($PS_H$) of the destination node H that will choose which of the two paths should be dropped.

The path from H to A will travel down the SNCP ring (RING 2) in both directions and reach the Service Selector ($SS_M$) of the primary node M by passing through both node G and the secondary node N and by utilizing the fiber span N-M of the MS shared protection ring. The Service Selector ($SS_M$) of the primary node M in turn selects one of the two signals and will send it to the destination node A.

The most apparent advantage of this solution is that the fiber span of the RING 2 between the interconnection nodes is missing. The further adavantage is that the number of STM-N ports utilized is reduced (a pair of I/O ports for each Network Element is saved).

A further and important advantage is that the number of selectors that the Network Manager and the Network Element have to manage passes from three (state of the art arrangement) to one. All this, naturally, without impairing the reliability against breaks under any circumstances.

The functions of primary and secondary nodes could be implemented both in hardware and in software and for this reason the present invention encompasses a computer program comprising code means adapted to carry out all the steps of the method when said program is run on a computer. It also comprises a computer-readable medium having a program recorded thereon, said computer-readable medium comprising code means adapted to carry out all the steps of the method when said program is run on a computer.

There have thus been shown and described a novel network architecture and a method which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

The invention claimed is:

1. A method for interconnecting a Multiplex Section Shared Protection ring network with a Subnetwork Connection Protection ring network in a Dual Node and Bridge & Switch architecture, the method comprising:

interconnecting a Multiplex Section Shared Protection ring network with a Subnetwork Connection Protection ring network via a primary interconnection node and a secondary interconnection node by an optical-fiber span, wherein said primary interconnection node comprises a means for performing a Drop & Continue operation, and only one Service Selector; and closing said Subnetwork Connection Protection ring network through the Service Selector of the primary interconnection node of the Multiplex Section Shared Protection ring network, wherein said primary interconnection node is free of a path selector.

2. A method according to claim 1, wherein closing said Subnetwork Connection Protection ring network through the Service Selector of the primary node, carried out in the primary interconnection node, comprises:

receiving a signal entering the Multiplex Section Shared Protection ring network, dropping it towards said Subnetwork Connection Protection ring network and continuing it towards said secondary interconnection node by utilizing an optical fiber span connecting said primary and secondary nodes;

selecting one signal, by means of said Service Selector, between a signal coming from said Subnetwork Connection Protection ring network and directly entering the primary node and a signal coming from said Subnetwork Connection Protection ring network, passed through the secondary node, and entering the primary node by travelling down an optical-fiber span that connects the primary and secondary nodes; and sending said signal that has been selected by the Service Selector to the destination node of the Multiplex Section Shared Protection ring network.

3. A network element for interconnecting a Multiplex Section Shared Protection ring network and a Subnetwork Connection Protection ring network in a Dual Node and Bridge & Switch architecture, said Dual Node comprises only one Service Selector, wherein said Service Selector selects one signal between:

a signal coming from said Subnetwork Connection Protection ring network and directly entering a primary node, and a signal coming from said Subnetwork Connection Protection ring network, passed through a secondary node, and entering said primary node by travelling down an optical-fiber span that connects the primary and secondary nodes; and sends said selected signal to the destination node of the Multiplex Section Shared Protection ring network, wherein said Dual Node is free of a path selector.

4. A computer program comprising code adapted to perform the method of claim 2, when said program is run on a computer.

5. A computer-readable medium having a program recorded thereon, said computer-readable medium comprising code adapted to perform the method of claim 2 when said program is run on a computer.

* * * * *